(12) United States Patent
Zhou et al.

(10) Patent No.: US 12,551,046 B2
(45) Date of Patent: Feb. 17, 2026

(54) POSITIONING SYSTEM FOR A BEVERAGE DISPENSER

(71) Applicant: Haier US Appliance Solutions, Inc., Wilmington, DE (US)

(72) Inventors: Eddy Zhou, Shanghai (CN); Zhihua Liu, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 873 days.

(21) Appl. No.: 17/796,400

(22) PCT Filed: May 6, 2022

(86) PCT No.: PCT/CN2022/091156
§ 371 (c)(1),
(2) Date: Jul. 29, 2022

(87) PCT Pub. No.: WO2023/212914
PCT Pub. Date: Nov. 9, 2023

(65) Prior Publication Data
US 2024/0180355 A1 Jun. 6, 2024

(51) Int. Cl.
*A47J 31/44* (2006.01)
*A47J 31/42* (2006.01)
*A47J 31/52* (2006.01)

(52) U.S. Cl.
CPC .......... *A47J 31/446* (2013.01); *A47J 31/42* (2013.01); *A47J 31/4407* (2013.01); *A47J 31/52* (2013.01)

(58) Field of Classification Search
CPC ...... A47J 31/002; A47J 31/4403; A47J 31/42; A47J 42/50; A47J 31/4492; A47J 31/407; A47J 31/446; A47J 31/4407; A47J 31/52

(Continued)

(56) References Cited

U.S. PATENT DOCUMENTS

| 5,542,342 A | 8/1996 | McNeill et al. |
| 6,705,208 B2 | 3/2004 | Lassota |

(Continued)

FOREIGN PATENT DOCUMENTS

| CN | 205144338 U | 11/2015 |
| CN | 205162801 U | 11/2015 |

(Continued)

OTHER PUBLICATIONS

International Search Report Corresponding to Application No. PCT/CN2022/091156 on Jan. 18, 2023.

*Primary Examiner* — Phuong T Nguyen
(74) *Attorney, Agent, or Firm* — Dority & Manning, P.A.

(57) ABSTRACT

A beverage brewing system includes a housing, a component tower extending from the housing, a brewing basket mounting bracket rotatably attached to the component tower, a brewing basket module removably accommodated within the brewing basket mounting bracket between an inserted position and a removed position, a controller provided within the housing, and a locking assembly provided within the component tower and operably connected with the controller, the locking assembly selectively contacting the brewing basket module. The locking assembly includes a lock mounting bracket attached to the component tower, a lock bar slidably mounted within the lock mounting bracket between a first position and a second position, and a switch attached to the lock mounting bracket and operably connected with the controller, the switch being selectively activated based on a position of the lock bar.

20 Claims, 7 Drawing Sheets

(58) Field of Classification Search
USPC .......................... 99/280, 285, 286, 295, 300
See application file for complete search history.

(56) References Cited

U.S. PATENT DOCUMENTS

| | | |
|---|---|---|
| 9,968,217 B2 | 5/2018 | Cable et al. |
| 9,993,107 B2 | 6/2018 | Blanc et al. |
| 2021/0174994 A1 | 6/2021 | Schlais |

FOREIGN PATENT DOCUMENTS

| | | | |
|---|---|---|---|
| CN | 207506410 U | | 5/2017 |
| CN | 208524563 U | | 9/2017 |
| CN | 208769525 U | | 1/2018 |
| CN | 108618622 A | | 7/2018 |
| CN | 208524563 | * | 2/2019 |
| CN | 208769525 | * | 4/2019 |
| CN | 107669125 B | | 7/2019 |

* cited by examiner

POSITIONING SYSTEM FOR A BEVERAGE DISPENSER

CROSS-REFERENCE TO RELATED APPLICATIONS

The present application is the National Stage Entry of and claims the benefit of priority under 35 U.S.C. § 371 to PCT Application Serial No. PCT/CN2022/091156 filed May 6, 2022 and entitled POSITIONING SYSTEM FOR A BEVERAGE DISPENSER, which is hereby incorporated by reference in its entirety for all purposes.

FIELD OF THE INVENTION

The present subject matter relates generally to beverage dispensers, and more particularly to position check systems for beverage dispensers.

BACKGROUND OF THE INVENTION

Beverage dispensers perform a range of operations related to preparing and dispensing various beverages on demand to users. Some such beverage dispensers incorporate certain preparation operations, resulting in a multifunctional, all-inclusive beverage machine. For one example, coffee machines include grinders for grinding coffee beans, a water tank for supplying water to the ground coffee, a first heating element to heat the water being supplied to the ground coffee, and a second heating element to provide heat to a container storing the beverage.

Such multifunctional beverage machines may operate automatically. For instance, upon receiving an input from a user to initiate a brewing operation, the beverage machine activates the grinder to grind supplied beans, subsequently supplying the ground beans to a basket. However, certain drawbacks exist to these machines. For instance, a user may forget to install a basket before inputting the initiation to perform the brewing operation. Moreover, the machine may fail to recognize a position of a basket and incorrectly supply the brewing materials (such as grounds and water).

Accordingly, a beverage dispenser that obviates one or more of the above-mentioned drawbacks would be beneficial. In particular, a beverage brewing system that prevents unintentional brewing operations would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a beverage brewing system is provided. The beverage brewing system may include a housing; a component tower extending from the housing; a brewing basket mounting bracket rotatably attached to the component tower; a brewing basket module removably accommodated within the brewing basket mounting bracket between an inserted position and a removed position; a controller provided within the housing; and a locking assembly provided within the component tower and operably connected with the controller. The locking assembly may selectively contact the brewing basket module. The locking assembly may include a lock mounting bracket attached to the component tower; a lock bar slidably mounted within the lock mounting bracket between a first position and a second position; and a switch attached to the lock mounting bracket and operably connected with the controller, the switch being selectively activated based on a position of the lock bar.

In another exemplary aspect of the present disclosure, a brewing basket positioning monitoring system is provided. The brewing basket positioning monitoring system may include a brewing basket mounting bracket rotatably attachable to the beverage dispenser and movable between an open position and a closed position; a brewing basket module removably accommodated within the brewing basket mounting bracket between an inserted position and a removed position; a controller provided within the beverage dispenser; and a locking assembly provided within the beverage dispenser and operably connected with the controller, the locking assembly selectively contacting the brewing basket module. The locking assembly may include a lock mounting bracket attached to the beverage dispenser; a lock bar slidably mounted within the lock mounting bracket between a first position and a second position; and a switch attached to the lock mounting bracket and operably connected with the controller, the switch being selectively activated based on a position of the lock bar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V. The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. The terms "coupled," "fixed," "attached to," and the like refer to both direct coupling, fixing, or attaching, as well as indirect coupling, fixing, or attaching through one or more intermediate components or features, unless otherwise specified herein.

Figure 1:
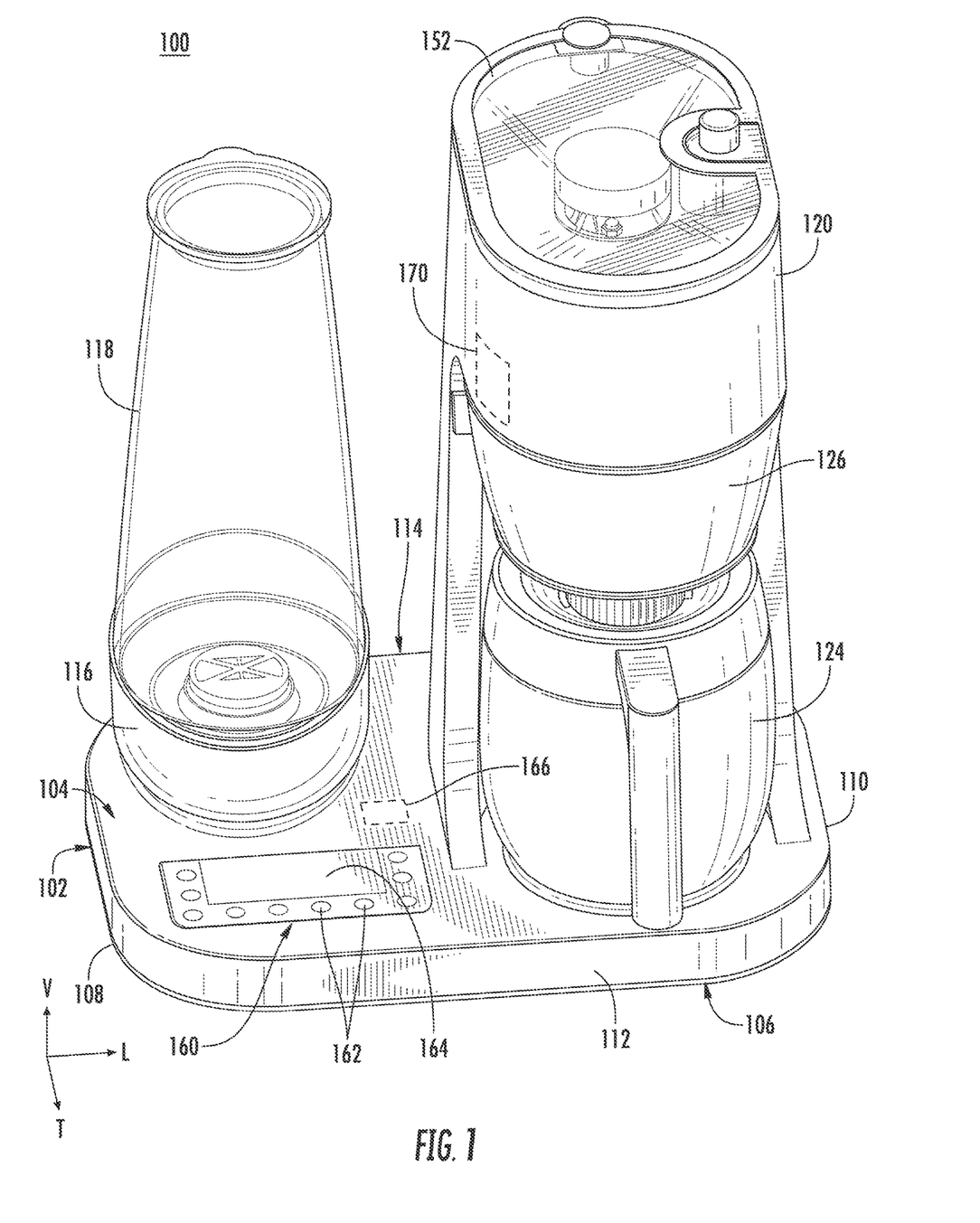
FIG. 1 provides a perspective view of a beverage brewing appliance according to exemplary embodiments of the present disclosure.
Figure 2:
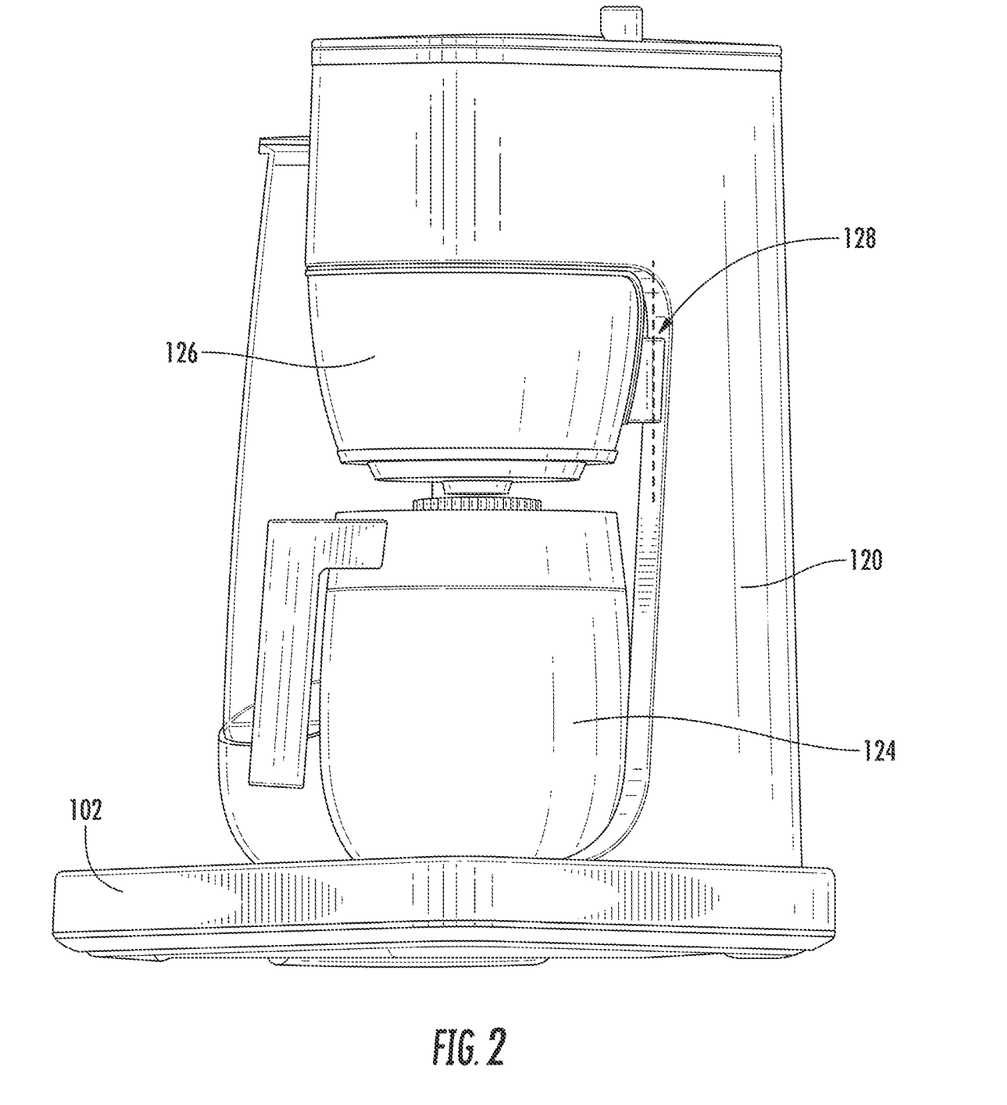
FIG. 2 provides a side perspective view of the exemplary beverage brewing appliance of FIG. 1.
Figure 3:
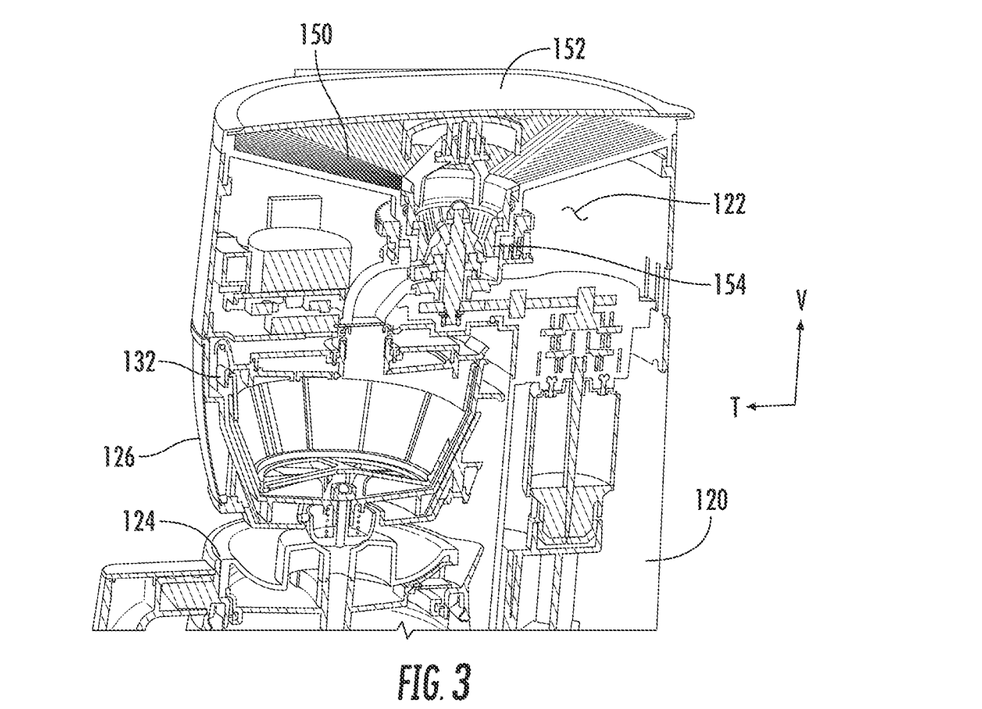
FIG. 3 provides a side cross-section view of a brewing module according to exemplary embodiments of the present disclosure.
Figure 4:
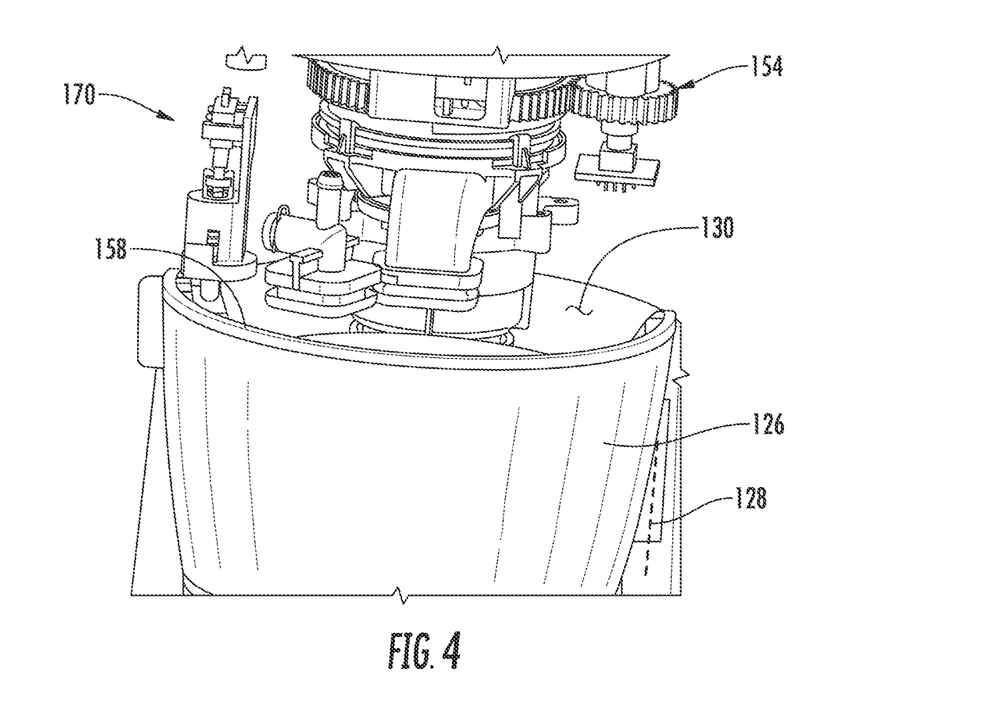
FIG. 4 provides a perspective view of interior components of the beverage brewing appliance of FIG. 1.

Referring now to the figures, an exemplary appliance will be described in accordance with exemplary aspects of the present subject matter. Specifically, FIG. 1 provides a perspective view of an exemplary appliance (e.g., a beverage brewing system or beverage appliance) 100 and FIG. 2 provides a side view of appliance 100. As illustrated, appliance 100 generally defines a vertical direction V, a lateral direction L, and a transverse direction T, each of which is mutually perpendicular, such that an orthogonal coordinate system is generally defined.

According to exemplary embodiments, appliance 100 includes a cabinet or housing 102 that is generally configured for supporting various components of appliance 100 and which may also define one or more internal chambers or compartments of appliance 100. In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that housing 102 does not necessarily require an enclosure and may simply include open structure supporting various elements of appliance 100. By contrast, housing 102 may enclose some or all portions of an interior of housing 102. It should be appreciated that housing 102 may have any suitable size, shape, and configuration while remaining within the scope of the present subject matter.

As illustrated, housing 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing appliance 100.

Appliance 100 may include a water tank mounting base 116. Water tank mounting base 116 may extend upward along the vertical direction V from top 104 of housing 102. For instance, water tank mounting base 116 may form a bowl shape into which a water tank 118 may be selectively inserted (or connected) to be used for beverage dispensing. Thus, housing 102 may include one or more passageways (such as tubes, pipes, or the like) in fluid connection with water tank mounting base 116. Water or liquid provided within water tank 118 may flow into the one or more passageways during a brewing or dispensing operation.

Appliance 100 may include a component tower 120. Component tower 120 may extend along the vertical direction V from top 104 of housing 102. Accordingly, component tower 120 may be provided adjacent to water tank mounting base 116. Component tower 120 may define a receiving space 122 for, e.g., a carafe 124. The receiving space 122 may form an alcove into which a beverage container (such as carafe 124) may be positioned to receive a liquid. According to at least one embodiment, a coffee carafe 124 is selectively positioned within receiving space 122 for accepting brewed coffee. Accordingly, receiving space 122 may be formed in part by top 104 of housing 102. Accordingly, a heating element (not shown) may be provided within housing 102. The heating element may thus be at least partially provided within receiving space 122. (e.g., at a bottom portion thereof to support or otherwise direct heat to carafe 124).

Referring still to FIG. 1, appliance 100 may include a control panel 160 that may represent a general-purpose Input/Output ("GPIO") device or functional block for appliance 100. In some embodiments, control panel 160 may include or be in operative communication with one or more user input devices 162, such as one or more of a variety of digital, analog, electrical, mechanical, or electro-mechanical input devices including rotary dials, control knobs, push buttons, toggle switches, selector switches, and touch pads. Additionally, appliance 100 may include a display 164, such as a digital or analog display device generally configured to provide visual feedback regarding the operation of appliance 100. For example, display 164 may be provided on control panel 160 and may include one or more status lights, screens, or visible indicators. According to exemplary embodiments, user input devices 162 and display 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Appliance 100 may further include or be in operative communication with a processing device or a controller 166 that may be generally configured to facilitate appliance operation. In this regard, control panel 160, user input devices 162, and display 164 may be in communication with controller 166 such that controller 166 may receive control inputs from user input devices 162, may display information using display 164, and may otherwise regulate operation of appliance 100. For example, signals generated by controller 166 may operate appliance 100, including any or all system components, subsystems, or interconnected devices, in response to the position of user input devices 162 and other control commands. Control panel 160 and other components of appliance 100 may be in communication with controller 166 via, for example, one or more signal lines or shared communication busses. In this manner, Input/Output ("I/O") signals may be routed between controller 166 and various operational components of appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 166 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 166 may be operable to execute programming instructions or micro-control code associated with an operating cycle of appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 166 as disclosed herein is capable of and may be operable to perform any methods, method steps, or portions of methods as disclosed herein. For example, in some embodiments, methods disclosed herein may be embodied in programming instructions stored in the memory and executed by controller 166.

The memory devices may also store data that can be retrieved, manipulated, created, or stored by the one or more processors or portions of controller 166. The data can include, for instance, data to facilitate performance of methods described herein. The data can be stored locally (e.g., on controller 166) in one or more databases and/or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 166 may further include a communication module or interface that may be used to communicate with one or more other component(s) of appliance 100, controller 166, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Component tower 120 may include a brewing basket mounting bracket 126. Brewing basket mounting bracket 126 may be rotatably attached to component tower 120. For instance, brewing basket mounting bracket 126 may rotate with respect to component tower 120 along an axis of rotation 128 defined along the vertical direction V. As shown primarily in FIG. 2, axis of rotation 128 may be provided along a lateral edge of component tower 120 (e.g., near second side 110). Brewing basket mounting bracket 126 may be rotatable between a closed position (e.g., accepted within component tower 120) and an open position (e.g., rotated away from component tower 120). Thus, brewing basket mounting bracket 126 may be selectively rotated away from component tower 120 to allow access thereto. Moreover, brewing basket mounting bracket 126 may define a module receiving space 130 therein. Accordingly, at least a portion of brewing basket mounting bracket 126 (and module receiving space 130) is received within component tower 120 in the closed position.

Figure 10:
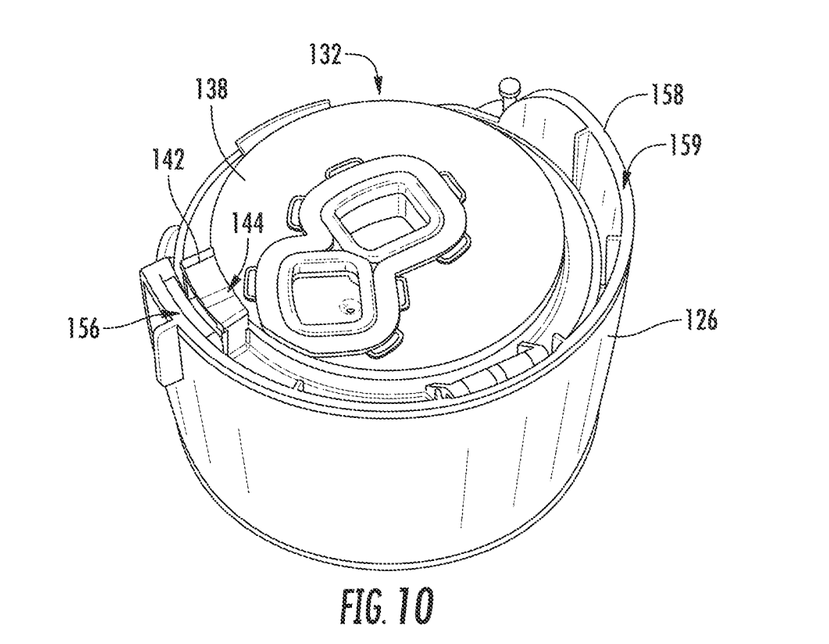
FIG. 10 provides a perspective view of a brewing basket mounting bracket including a brewing basket module according to exemplary embodiments of the present disclosure.

Brewing basket mounting bracket 126 may include a bracket bulge 156. For instance, brewing basket mounting bracket 126 may have a generally cylindrical shape (or a frustoconical shape) defined by an outer wall 158 thereof. Bracket bulge 156 may protrude from outer wall 158 along the vertical direction V. For instance, bracket bulge 156 may protrude from a top surface 159 of outer wall 158. According to at least one embodiment (as shown in FIG. 10), bracket bulge 156 may be provided inward (e.g., toward axis 128 or a center of brewing basket mounting bracket 126) from outer wall 158. It should be noted that a precise location of bracket bulge 156 may vary according to specific embodiments, and the disclosure is not limited to the examples given herein.

Appliance 100 may include a brewing basket module 132. Brewing basket module 132 may be selectively received within module receiving space 130 of brewing basket mounting bracket 126. For instance, brewing basket module 132 may be accommodated within brewing basket mounting bracket 126 between an inserted position (FIG. 10) and a removed position (FIG. 9).

Figure 9:
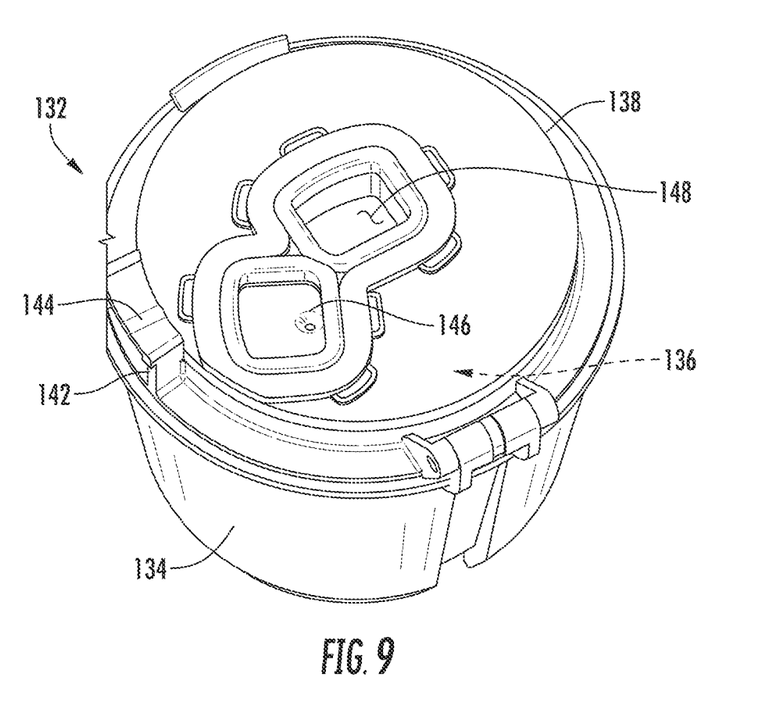
FIG. 9 provides a perspective view of a brewing basket module according to exemplary embodiments of the present disclosure.

Referring briefly to FIG. 9, brewing basket module 132 may include a basket 134 defining a material receiving space 136. Brewing materials may be selectively supplied within material receiving space 136, such as filters (e.g., coffee filters), coffee grounds, tea leaves, or the like. Basket 134 may have a generally cylindrical shape (or a truncated conical shape), having a central axis defined along the vertical direction V. Other shapes may be incorporated for basket 134, however, and the disclosure is not limited to the examples given herein. For example, basket 134 is shaped complementary to brewing basket mounting bracket 126. Accordingly, brewing basket module 132 may fit easily and securely within brewing basket mounting bracket 126.

Brewing basket module 132 may include a lid 138. Lid 138 may be movably (e.g., rotatably) coupled to basket 134 to move between an open position and a closed position. For instance, lid 138 may rotate about an axis of rotation 140 defined along a horizontal direction (e.g., the lateral direction L or the transverse direction T, or an angle therebetween). Lid 138 may selectively cover material receiving space 136 (e.g., in the closed position).

Figure 11:
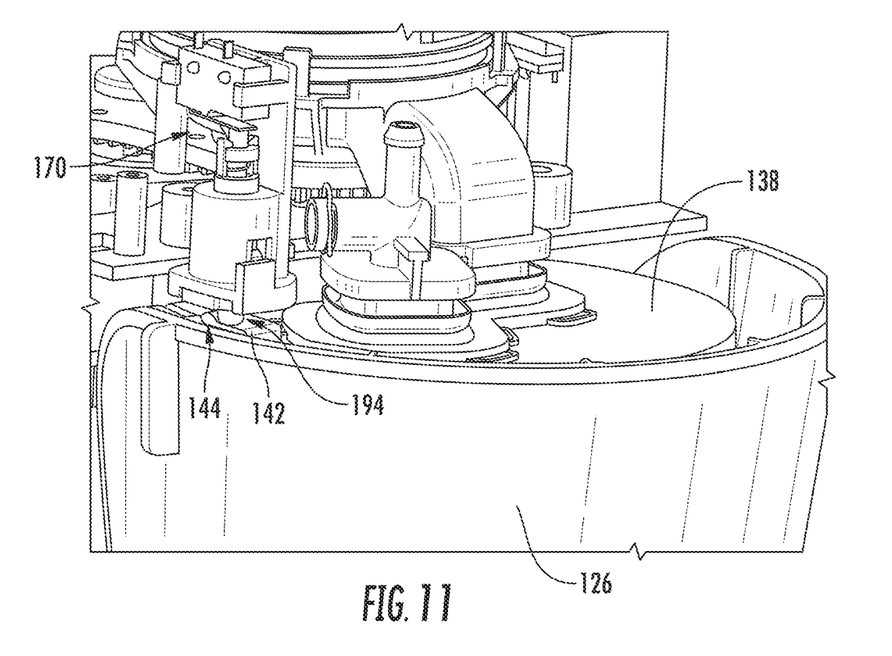
FIG. 11 provides a close-up perspective view of the brewing basket module of FIG. 9 in an installed position.

Lid 138 may include a lid protrusion tab 142. Lid protrusion tab 142 may protrude from lid 138 (e.g., along the vertical direction V). According to some embodiments, lid protrusion tab 142 extends about an edge of lid 138. For one example, lid 138 may have a circular shape or profile (e.g., when viewed from above) and lid protrusion tab 142 extends at least partially along a circumferential edge of lid 138. Lid protrusion tab 142 may protrude a predetermined amount above lid 138. For instance, a top of lid protrusion tab 142 may be located above a top of lid 138 along the vertical direction V. According to one embodiment, lid protrusion tab 142 is level with a top of brewing basket mounting bracket 126 (FIG. 11). In detail, the outer wall 158 of brewing basket mounting bracket 126 may be coplanar (e.g., along the lateral direction L and transverse direction T) with lid protrusion tab 142.

Lid protrusion tab 142 may include a lid bulge 144. Lid bulge 144 may protrude (e.g., along the vertical direction V) from lid protrusion tab 142. Lid bulge 144 may extend across a width of lid protrusion tab 142. Referring to the example above, lid bulge 144 may extend along a radial direction of lid protrusion tab 142. Lid bulge 144 may be convex along the vertical direction V. For instance, lid bulge 144 may form a semi-cylindrical bump on lid protrusion tab 142 (e.g., along the circumferential direction described in the example above). Lid bulge 144 may selectively interact with a locking assembly (described below).

Lid 138 may have a plurality of apertures defined therein. For instance, a liquid aperture 146 and a powder aperture 148 may be formed in lid 138. Liquid aperture 146 and powder aperture 148 may be spaced apart from each other (e.g., about lateral direction L or transverse direction T). Liquid and powder apertures 146 and 148 may be formed through lid 138 along the vertical direction V (e.g., when lid 138 is in the closed position). Thus, a plurality of access points may be defined in lid 138. For instance, liquid from water tank 118 may be delivered to basket 134 via liquid aperture 146. Additionally or alternatively, brewing materials (e.g., coffee grounds) may be delivered to basket 134 via powder aperture 148.

Appliance 100 may include a hopper 150. Hopper 150 may be positioned within component tower 120. For instance, hopper 150 may be positioned above brewing basket mounting bracket 126. Hopper 120 may provide a receptacle for certain raw brewing materials (e.g., whole coffee beans). Accordingly, a hopper top 152 may be provided over hopper 150. Hopper 150 may include one or more inclined surfaces 154 creating a funnel toward a center thereof. Accordingly, the raw brewing materials supplied to hopper 150 may be funneled toward a center of hopper 150.

Appliance 100 may include a grinding mechanism 154. Grinding mechanism 154 may be positioned within component tower 120. For instance, grinding mechanism 154 may be positioned between hopper 150 and brewing basket mounting bracket 126. Grinding mechanism 154 may include one or more gears configured to perform a grinding or crushing action on materials supplied thereto. For example, coffee beans placed into hopper 150 are fed to grinding mechanism 154, which in turn grind the coffee beans into a powder (e.g., coffee grounds). The coffee grounds may then be supplied to brewing basket module 132 accommodated within brewing basket mounting bracket 126.

Referring now to FIGS. 4 through 7, appliance 100 may include a locking assembly 170. According to this description, locking assembly 170 may define an axial direction A, a radial direction R, and a circumferential direction C. For reference, axial direction A may correspond with vertical direction V described above (e.g., in parallel to the same). Locking assembly 170 may be provided within component tower 120. Locking assembly 170 may be operably connected with controller 166, as will be described further below. Locking assembly 170 may selectively contact each of brewing basket mounting bracket 126 and brewing basket module 132. Notably, locking assembly 170 may mechanically communicate with each of brewing basket mounting bracket 126 and brewing basket module 132 and electrically communicate with controller 166 to safely and effectively operate beverage brewing system (appliance) 100.

Locking assembly 170 may be attached to component tower 120. For instance, locking assembly 170 may be attached to, e.g., an inner wall of component tower 120. According to some embodiments, locking assembly 170 is provided laterally adjacent to grinding mechanism 154. Thus, locking assembly 170 may be provided above (e.g., along the vertical direction V) brewing basket mounting bracket 126 and brewing basket module 132. In detail, locking assembly 170 may selectively interact with lid protrusion tab 142 and lid bulge 144 of lid 138, as well as with bracket bulge 156.

Locking assembly 170 may include a lock mounting bracket 172. Lock mounting bracket 172 may be fixed within component tower 120. For instance, lock mounting bracket 172 may be attached to the inner surface of component tower 120 (e.g., adjacent to grinding mechanism 154). Lock mounting bracket 172 may be attached to component tower 120 by any suitable means. For instance, lock mounting bracket 172 may be attached by one or more fasteners, adhesives, clips, magnets, snaps, or the like. Additionally or alternatively, lock mounting bracket 172 may include a vertical support panel 174 and a horizontal support panel 176. Vertical support panel 174 may extend along the vertical direction V (or the axil direction A) while the horizontal support panel 176 extends along the lateral direction L (or radial direction R). For instance, horizontal support panel 176 extends from a bottom of vertical support panel 174, e.g., radially outward.

Lock mounting bracket 172 may include a receiving tube 178. Receiving tube 178 may be defined along the axial direction A (or vertical direction V). For instance, receiving tube 178 may define a cylindrical aperture 180 into which a lock bar (described below) is inserted. Receiving tube 178 may extend along the axial direction A (or vertical direction V) to provide stability and rigidity to lock mounting bracket 172. For instance, receiving tube 178 may extend from horizontal support panel 176 upward along the vertical direction V (or axial direction A). At least a portion of receiving tube 178 may be connected with vertical support panel 174.

Additionally or alternatively, receiving tube 178 may include one or more hook apertures 182 defined therethrough. Hook apertures 182 may be defined through receiving tube 178 along the radial direction R. Moreover, hook apertures 182 may be located 180 degrees apart from each other (e.g., along the circumferential direction C). According to some embodiments, hook apertures 182 extend (along the vertical direction V) about 50% of a total length 178L of receiving tube 178. Additionally or alternatively, hook apertures 182 may be located proximate horizontal support panel 176. For instance, hook apertures 182 may extend upward along the vertical direction V about 50% the total length of receiving tube 178. In some embodiments, hook apertures 182 initiate or start at or near horizontal support panel 176.

Figure 6:
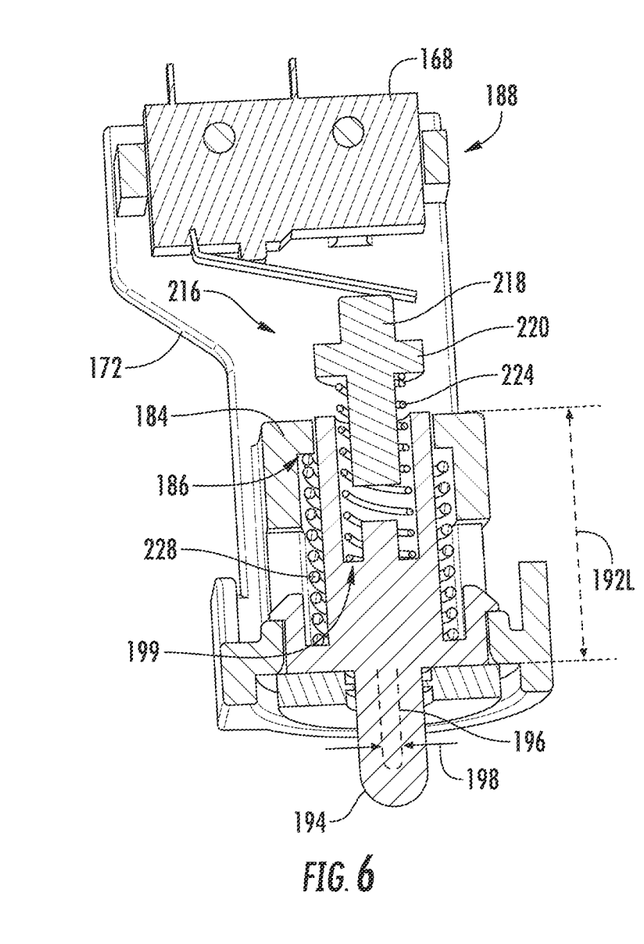
FIG. 6 provides a cross-section view of the exemplary lock assembly of FIG. 5.

Lock mounting bracket 172 may include a bracket flange 184. Referring briefly to FIG. 6, bracket flange 184 may be formed at or near a distal end 179 of receiving tube 178. For instance, bracket flange 184 may extend radially inward from distal end 179 of receiving tube 178. Accordingly, bracket flange 184 may include a retaining surface 186 facing downward along the vertical direction V (or the axial direction A). For instance, retaining surface 186 may be provided within cylindrical aperture 180. As will be described below, a restoring spring may contact retaining surface 186. According to some embodiments, bracket flange 184 extends 360 degrees about receiving tube 178. However, bracket flange 184 may include one or more individual tabs protruding radially inward from receiving tube 178.

Figure 7:
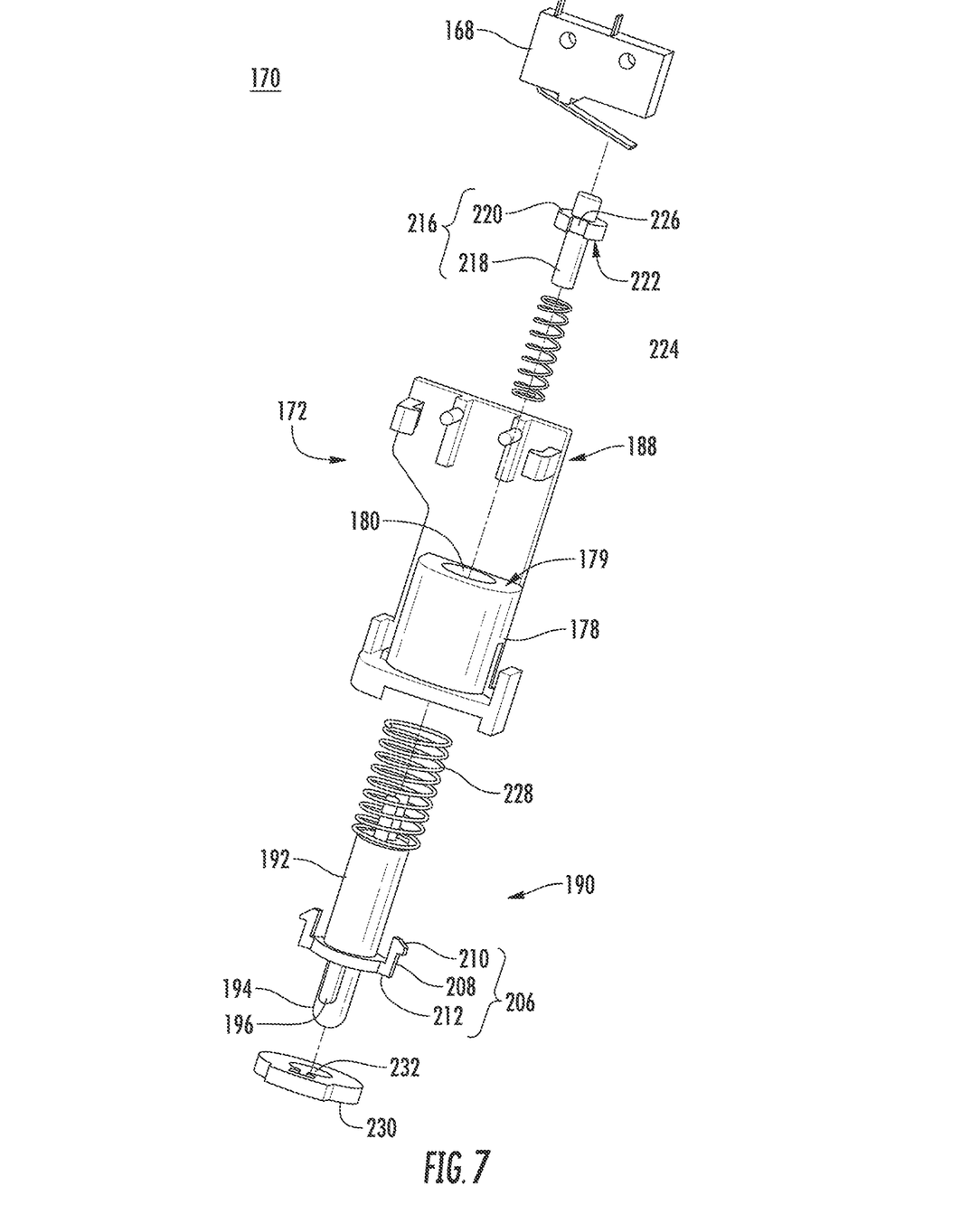
FIG. 7 provides an exploded view of the exemplary lock assembly of FIG. 5.
Figure 8:
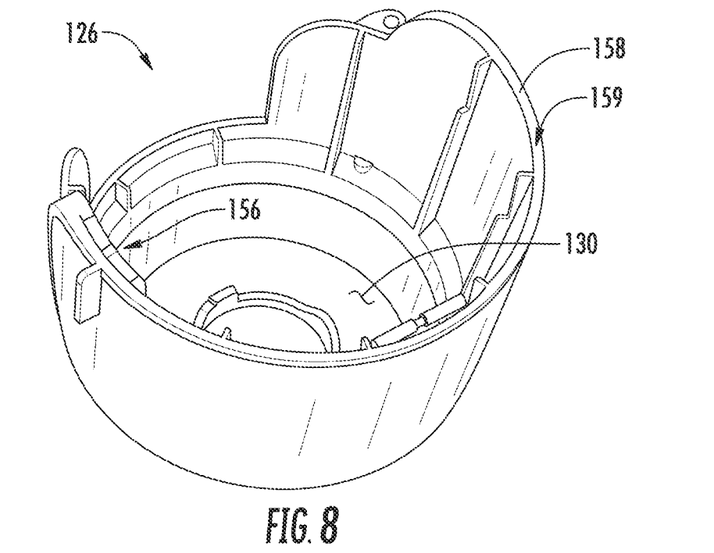
FIG. 8 provides a perspective view of a brewing basket mounting bracket according to exemplary embodiments of the present disclosure.

Lock mounting bracket 172 may include a switch coupling assembly 188. Switch coupling assembly 188 may protrude from vertical support panel 174 (e.g., along the radial direction R or lateral direction L). Switch coupling assembly 188 may be provided adjacent to receiving tube 178. For instance, switch coupling assembly 188 may be located above receiving tube 178 (e.g., along the vertical direction V or axial direction A). Referring briefly to FIG. 7, switch coupling assembly 188 may include one or more coupler fingers 1881 and one or more nubs 1882. Generally, switch coupling assembly 188 may include one or more features for coupling a switch (described below) to vertical support panel 174. Indeed, switch coupling assembly 188 may include any suitable combination of retaining features and the disclosure is not limited to the examples given herein.

A switch 168 may be attached to lock mounting bracket 172 via switch coupling mechanism 188. Switch 168 may be any suitable switch capable of receiving a mechanical input and emitting a signal corresponding to the mechanical input, such as a reed switch, a contact switch, or the like. However, switch 168 may be an electrical switch as certain applications dictate. Accordingly, switch 168 may be operably connected with controller 166. Switch 168 may be a single throw normally open contact switch, for example. Accordingly, switch 168 may communicate with controller 166 upon activation or contact (as will be explained below).

Figure 5:
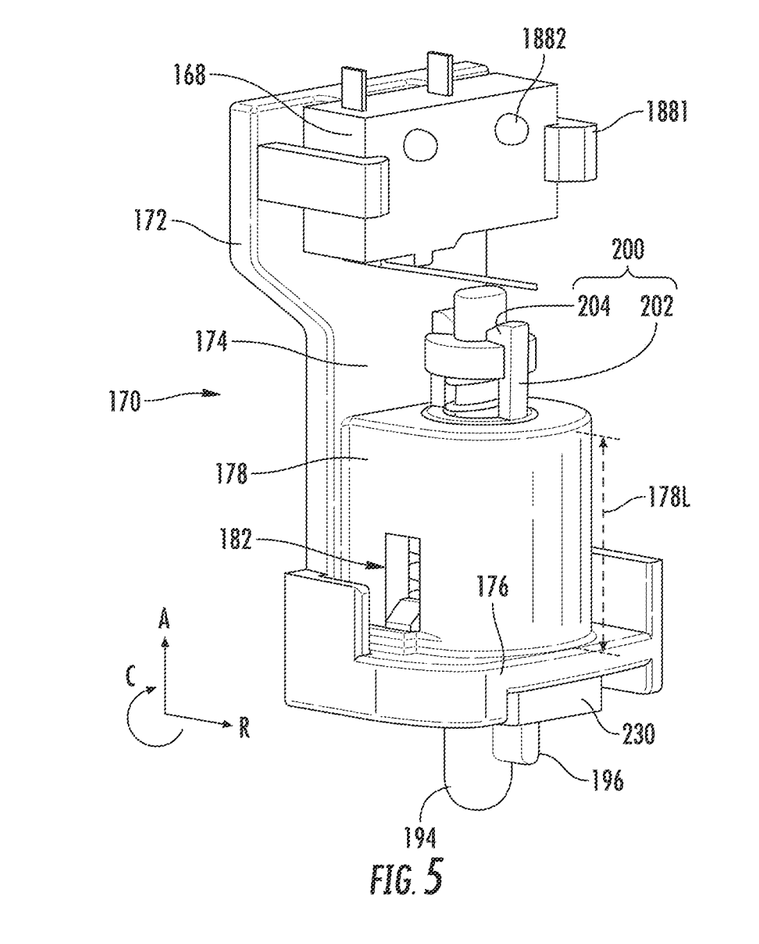
FIG. 5 provides a perspective view of a lock assembly according to exemplary embodiments of the present disclosure.

Locking assembly 170 may include a lock bar 190. Lock bar 190 may be slidably mounted or received within lock mounting bracket 172. For instance, lock bar 190 may be slidable between a first position and a second position within lock mounting bracket 172. For instance, the first position may correspond to lock bar 190 being in a lowermost rest position and switch 168 being deactivated (FIG. 5). The second position may correspond to lock bar 190 being in an uppermost engaged position and switch 168 being activated (FIG. 11). Thus, lock bar 190 may be shaped complementary to cylindrical aperture 180. Although lock bar 190 (and cylindrical aperture 180) are illustrated as cylinders, it should be understood that any suitable shape may be utilized to form each of lock bar 190 and cylindrical aperture 180, and the disclosure is not limited to the embodiments illustrated and described herein.

Lock bar 190 may include a body 192 and a pin 194 extending from body 192. For instance, pin 194 may protrude downward (e.g., along the vertical direction V) from body 192. Pin 194 may be rounded at a distal end thereof. For instance, the distal end of pin may be hemispherical. As will be explained in further detail below, pin 194 may interact with lid protrusion tab 142 and lid bulge 144. Additionally or alternatively, lock bar 190 may include a rib 196. Rib 196 may protrude along the radial direction R and extend along the axial direction A from pin 194.

Rib 196 may define a thickness (e.g., along the lateral direction L) 198. The thickness 198 of rib 196 may be less than that of pin 194. Additionally or alternatively, a distal end of rib 196 may be provided above (e.g., along the vertical direction V or axial direction A) the distal end of pin 194. Further, distal end of rib 196 may be curved (e.g., semi-cylindrical) convexly. For instance, the distal end rib 196 may be rounded downward along the axial direction A. Accordingly, rib 196 may interact with bracket bulge 156 of brewing basket mounting bracket 126.

Body 192 may define a plunger cavity 199. For instance, plunger cavity 199 may be a blind hole defined along the axial direction A from a top of body 192. Plunger cavity 199 may extend to a predetermined depth within body 192. According to some embodiments, plunger cavity 199 extends to a depth of between about 45% and about 55% of a total axial length 192L of body 192. Further, a diameter of plunger cavity 199 may be between about 50% and about 60% of a diameter of body 192. Accordingly, plunger cavity 199 may be configured to accept a plunger (described below) and a buffer spring (described below) therein.

Lock bar 190 may include a first retaining hook 200. According to some embodiments, at least two first retaining hooks 200 are provided. However, it should be understood that the number of first retaining hooks 200 provided may vary according to specific embodiments and the disclosure is not limited to the examples given herein. Hereinafter, a single first retaining hook 200 will be described with the understanding that the description may apply to two or more first retaining hooks 200. First retaining hook 200 may extend from the top of body 192 (e.g., along the vertical direction V or axial direction A). First retaining hook 200 may include a base 202 extending along the axial direction A and a latch 204 extending inward along the radial direction R from base 202. In detail, latch 204 may form a hook together with base 202 (e.g., at the distal end of first retaining hook 200). As mentioned above, according to some embodiments, two first retaining hooks 200 are provided opposite each other along the radial direction R.

Lock bar 190 may include a second retaining hook 206. According to some embodiments, at least two second retaining hooks 206 are provided. However, it should be understood that the number of second retaining hooks 206 provided may vary according to specific embodiments and the disclosure is not limited to the examples given herein. Hereinafter, a single second retaining hook 206 will be described with the understanding that the description may apply to two or more second retaining hooks 206. Second retaining hook 206 may extend from the bottom of body 192 (e.g., along the vertical direction V or axial direction A). Second retaining hook 206 may include a base 208 extending along the axial direction A and a latch 210 extending outward along the radial direction R from base 208. In detail, latch 210 may form a hook together with base 208 (e.g., at the distal end of second retaining hook 206). As mentioned above, according to some embodiments, two second retaining hooks 206 are provided opposite each other along the radial direction R.

Additionally or alternatively, second retaining hook 206 may be spaced apart from body 192 along the radial direction R. As best seen in FIG. 6, a gap along the radial direction R may be formed between second retaining hook 206 and body 192. Accordingly, second retaining hook 206 may include a radial arm 212 connecting base 208 with body 192 of lock bar 190. Radial arm 212 may protrude from body 192 at or near a junction of body 192 and pin 194. Radial arm 212 may include a body retention surface 214 facing upward (e.g., along the axial direction A or vertical direction V).

Locking assembly 170 may include a plunger 216. Plunger 216 may be slidably received within lock bar 190. For instance, plunger 216 may be slidably received within plunger cavity 199. Plunger 216 may be shaped commensurate with plunger cavity 199. According to at least one embodiment, plunger 216 is cylindrical. However, plunger 216 may have any suitable shape and the disclosure is not limited to the examples described herein. Plunger 216 may selectively contact switch 168. For instance, a top of plunger 216 may contact switch 168 according to a position of one of brewing basket mounting bracket 126 or brewing basket module 132.

Plunger 216 may include a body 218 and a flange 220 protruding along the radial direction R from body 218. For instance, body 218 may have a first diameter D1 while flange 220 may have a second diameter D2. Second diameter D2 may be larger than first diameter D1. Flange 220 may be provided proximate a top of plunger 216. For one example, flange 220 is provided at a location between about 10% and about 30% below the top of plunger 216. Accordingly, flange 220 may include a plunger retention surface 222 facing downward (e.g., along the axial direction A or vertical direction V). In detail, plunger retention surface 222 may face a bottom of plunger cavity 199 along the axial direction A.

According to some embodiments, locking assembly 170 includes a buffering spring 224. Buffering spring 224 may be provided between plunger 216 (e.g., contacting plunger retention surface 222) and plunger cavity 199 (e.g., contacting a bottom surface of plunger cavity 199). Accordingly, buffer spring 224 may bias the plunger 216 along the axial direction A (e.g., upward along the axial direction A). Buffering spring 224 may be any suitable elastic member, such as a compression coil spring. However, it should be understood that any elastic member capable of providing resistance may be utilized as buffering spring 224 and the disclosure is not limited to the examples given herein.

Flange 220 may include a notch 226 defined therein. Hereinafter, notch 226 will be described in detail with the understanding that a plurality of notches 226 may be formed in flange 220. Accordingly, the following description may apply to a single notch 226, a pair of notches 226, or a plurality of notches 226. Notch 226 may be defined along the axial direction A through flange 220. Additionally or alternatively, notch 226 may be formed radially into flange 220. Accordingly, notch 226 may define a portion of flange 220 having a reduced diameter. In some embodiments, a circumferential width of notch 226 corresponds to a circumferential width of first retaining hook 200. Thus, first retaining hook 200 may be received within notch 226. In detail, base 202 of first retaining hook 200 may be received within notch 226 while latch 204 may contact a top surface of flange 220. Accordingly, plunger 216 may be restrained within plunger cavity 199 by first retaining hook 200.

Locking assembly 170 may include a restoring spring 228. Restoring spring 228 may be provided around lock bar 190. For instance, restoring spring 228 may be provided between bracket flange 184 and radial arm 212. Restoring spring 228 may contact each of body retention surface 214 and retaining surface 186. Accordingly, restoring spring 228 may bias lock bar 190 downward (e.g., along the axial direction A) with respect to lock mounting bracket 172 (e.g., bracket flange 184). Restoring spring 228 may be any suitable elastic member, such as a compression coil spring. However, it should be understood that any elastic member capable of providing resistance may be utilized as restoring spring 228 and the disclosure is not limited to the examples given herein.

Locking assembly 170 may include a cap 230. Cap 230 may be attached to lock mounting bracket 176. For instance, cap 230 may be attached to a distal end of lock mounting bracket 176 (e.g., along the axial direction A). Cap 230 may include a through hole 232 defined therethrough along the axial direction A. Pin 194 and rib 196 may penetrate through hole 232. Additionally or alternatively, radial arm 212 may contact cap 230 (e.g., a top surface of cap 230). For instance, when lock bar 190 is in a first position (e.g., a rest position), radial arm 212 may be in contact with the top surface of cap 230 within lock mounting bracket 172. Cap 230 may be formed from a flexible material, such as rubber, plastic, composite, or the like. Moreover, cap 230 may be removably attached to lock mounting bracket 172. For instance, cap 230 may be connected with lock mounting bracket 172 via a snap fit, an adhesive, one or more fasteners, a magnet, a clasp, or any other suitable means.

As described above, lock assembly 170 may be provided within component tower 120 to selectively interact with brewing basket mounting bracket 126 and brewing basket module 132. In detail, with reference to FIGS. 4 and 11, lock assembly 170 may be positioned above brewing basket mounting bracket 126 (e.g., along the vertical direction V). As brewing basket mounting bracket 126 is rotated from the open position to the closed position, bracket bulge 156 approaches lock bar 190 (e.g., rib 196). For the following example, brewing basket module 132 is not present within brewing basket mounting bracket 126. Bracket bulge 156 may contact rib 196 and apply a force upward along the vertical direction V to lock bar 190. Because the distal end of rib 196 is positioned higher than the distal end of pin 194, lock bar 190 may be forced upward only a small amount (e.g., without activating switch 168). When brewing basket mounting bracket 126 is in the closed position, rib 196 is moved over bracket bulge 156. Thus, brewing basket mounting bracket 126 may be restrained in the closed position.

According to another scenario, brewing basket module 132 is present within brewing basket mounting bracket 126. As described above, appliance 100 may perform a full service of brewing and dispensing operations. According to one example, appliance 100 accepts full coffee beans (e.g., within hopper 150), grinds the coffee beans (e.g., via grinding mechanism 154), supplies the ground coffee to brewing basket 134, and supplies water (or liquid) to brewing basket 134 (e.g., via liquid aperture 146). Accordingly and advantageously, the ground coffee and water should be supplied only when brewing basket module 132 is present within module receiving space 130 of brewing basket mounting bracket 126.

Thus, switch 168 is operably connected with controller 166 such that the brewing process is initiated only when switch 168 is activated (e.g., by locking assembly 170). When brewing basket mounting bracket 126 is rotated into the closed position, lid protrusion tab 142 contacts pin 194 of lock bar 190. Pin 194 is forced upward (e.g., along the vertical direction V) by lid bulge 144 when brewing basket mounting bracket 126 is moved into the closed position. In turn, plunger 216 presses switch 168 into the activated state. Controller 166 is then able to initiate the brewing process with confirmation that brewing basket module 132 is properly in place (e.g., as shown in FIG. 11). Restoring spring 228 may bias lock bar 190 downward (e.g., along the vertical direction V) to prevent unintended activation of switch 168. Moreover, buffer spring 224 may bias plunger 216 downward (e.g., along the vertical direction V) to prevent unintended activation of switch when brewing basket module 132 is not present within receiving space 130 of brewing basket mounting bracket 126.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A beverage brewing system defining a vertical direction, a lateral direction, and a transverse direction, the beverage brewing system comprising:
   a housing;
   a component tower extending from the housing;
   a brewing basket mounting bracket rotatably attached to the component tower;
   a brewing basket module removably accommodated within the brewing basket mounting bracket between an inserted position and a removed position;
   a controller provided within the housing; and
   a locking assembly provided within the component tower and operably connected with the controller, the locking assembly selectively contacting the brewing basket module, wherein the locking assembly comprises:
      a lock mounting bracket attached to the component tower;
      a lock bar slidably mounted within the lock mounting bracket between a first position and a second position; and
      a switch attached to the lock mounting bracket and operably connected with the controller, the switch being selectively activated based on a position of the lock bar.

2. The beverage brewing system of claim 1, wherein the brewing basket module comprises:
   a basket defining a receiving space;
   a lid rotatably coupled to the basket; and
   a lid protrusion tab protruding from the lid, the lid protrusion tab forming a lid bulge.

3. The beverage brewing system of claim 2, wherein the lid protrusion tab is disposed in contact with the lock assembly in the inserted position.

4. The beverage brewing system of claim 1, wherein the lock assembly defines an axial direction and a radial direction, and wherein the lock assembly further comprises:
   a plunger slidably received within the lock bar; and
   a buffer spring connected between the plunger and the lock bar, the buffer spring biasing the plunger along the axial direction, wherein the plunger contacts the switch at the inserted position.

5. The beverage brewing system of claim 4, wherein the lock assembly further comprises:
   a restoring spring connected between the lock bar and the lock mounting bracket, the restoring spring biasing the lock bar along the axial direction; and
   a cap attached to a distal end of the lock mounting bracket.

6. The beverage brewing system of claim 5, wherein the lock bar comprises a first retaining hook engaged with the plunger, the first retaining hook comprising:
   a base extending along the axial direction; and
   a latch extending inward from the base along the radial direction.

7. The beverage brewing system of claim 6, wherein the plunger comprises:
   a body; and
   a flange protruding along the radial direction from the body, the flange defining a notch therein along the axial direction, and wherein the latch of the first retaining hook contacts the flange via the notch.

8. The beverage brewing system of claim 5, wherein the lock bar further comprises a second retaining hook, the second retaining hook comprising:
   a base extending along the axial direction; and
   a latch extending outward from the base along the radial direction.

9. The beverage brewing system of claim 8, wherein the lock mounting bracket comprises a bracket flange protruding radially inward from an inner surface of the lock mounting bracket, and wherein the restoring spring is provided between the bracket flange and the lock bar along the vertical direction.

10. The beverage brewing system of claim 4, wherein the brewing basket mounting bracket comprises a bracket bulge, wherein the lock bar comprises a rib protruding along the radial direction and extending along the axial direction, and wherein the rib contacts the bracket bulge in a closed position of the brewing basket mounting bracket.

11. The beverage brewing system of claim 1, further comprising:
a water tank selectively attached to the housing via a water tank mounting base;
a hopper positioned within the component tower and positioned above the brewing basket mounting bracket; and
a griding mechanism provided within the component tower and positioned between the hopper and the brewing basket mounting bracket.

12. A brewing basket positioning monitoring system for a beverage dispenser, the brewing basket positioning monitoring system defining an axial direction, a radial direction, and a circumferential direction, the brewing basket position monitoring system comprising:
a brewing basket mounting bracket rotatably attachable to the beverage dispenser and movable between an open position and a closed position;
a brewing basket module removably accommodated within the brewing basket mounting bracket between an inserted position and a removed position;
a controller provided within the beverage dispenser; and
a locking assembly provided within the beverage dispenser and operably connected with the controller, the locking assembly selectively contacting the brewing basket module, wherein the locking assembly comprises:
a lock mounting bracket attached to the beverage dispenser;
a lock bar slidably mounted within the lock mounting bracket between a first position and a second position; and
a switch attached to the lock mounting bracket and operably connected with the controller, the switch being selectively activated based on a position of the lock bar.

13. The brewing basket positioning monitoring system of claim 12, wherein the brewing basket module comprises:
a basket defining a receiving space;
a lid rotatably coupled to the basket; and
a lid protrusion tab protruding from the lid, the lid protrusion tab forming a lid bulge.

14. The brewing basket positioning monitoring system of claim 13, wherein the lid protrusion tab is in contact with the lock assembly when the brewing basket module is in the inserted position.

15. The brewing basket positioning monitoring system of claim 12, wherein the lock assembly defines an axial direction, a radial direction, and a circumferential direction, and wherein the lock assembly further comprises:
a plunger slidably received within the lock bar; and
a buffer spring connected between the plunger and the lock bar, the buffer spring providing axial resistance to the plunger, wherein the plunger contacts the switch when the brewing basket module is in the inserted position.

16. The brewing basket positioning monitoring system of claim 15, wherein the lock assembly further comprises:
a restoring spring connected between the lock bar and the lock mounting bracket, the restoring spring providing axial resistance to the lock bar; and
a cap attached to a distal end of the lock mounting bracket.

17. The brewing basket positioning monitoring system of claim 16, wherein the lock bar comprises a first retaining hook, the first retaining hook comprising:
a base extending along the axial direction; and
a latch extending inward from the base along the radial direction.

18. The brewing basket positioning monitoring system of claim 17, wherein the plunger comprises:
a body; and
a flange protruding along the radial direction from the body, the flange defining a pair of notches therein along the axial direction, and wherein the latch of the first retaining hook contacts the flange via one of the pair of notches.

19. The brewing basket positioning monitoring system of claim 16, wherein the lock bar further comprises a second retaining hook, the second retaining hook comprising:
a base extending along the axial direction; and
a latch extending outward from the base along the radial direction.

20. The brewing basket positioning monitoring system of claim 19, wherein the lock mounting bracket comprises a bracket flange protruding radially inward from an inner surface of the lock mounting bracket, and wherein the latch of the second retaining hook contacts the bracket flange when the lock bar is in the first position.

* * * * *